UNITED STATES PATENT OFFICE.

FRANK H. CROCKARD, OF BIRMINGHAM, ALABAMA.

METHOD OF PRODUCING PIG-IRON.

1,274,245.  Specification of Letters Patent.  Patented July 30, 1918.

No Drawing.  Application filed April 2, 1917. Serial No. 159,262.

*To all whom it may concern:*

Be it known that I, FRANK H. CROCKARD, a citizen of the United States, residing at Birmingham, Jefferson county, Alabama, have invented certain new and useful Improvements in Methods of Producing Pig-Iron, of which the following is a specification.

It has heretofore been the regular practice in manufacturing pig iron to charge into the top of the blast furnace continuously a suitable ore and a flux together with a fuel suitable for the purpose of producing a desired quality of pig iron. The ore charged into the furnace furnishes the iron from which a pig iron is produced, while the fuel in combustion reduces the oxid to a metallic form and supplies the necessary heat for the many reactions occurring within a blast furnace, and also melts the resultant products. The flux addition to the furnace renders various compounds of the charge fusible at certain temperatures and thus makes it possible to remove in a fluid state the ashy and earthy material contained in the ore and coke.

Pig iron so produced is used in the manufacture of steel and iron by various and well-known processes, and is sometimes used for the entire charge, while in other cases it may form only a part of the charge.

In the conversion of pig iron into steel ingots or bars and their subsequent manufacture into finished products there always results a large loss of the rough material from cropping and shearing in the various kinds of rolling mills, and the material thus discarded is known as scrap. This scrap is generally used by remelting it in an open hearth or electric furnace and invariably forms a greater or lesser part of the charge.

My invention relates to a method whereby scrap, instead of being remelted in an open hearth furnace and converted again into steel, can be used as part or the whole of the metal in the charge of a blast furnace and converted into pig iron or iron of very desirable quality.

In certain territories in the United States it is impossible to make what is known as Bessemer pig iron on account of the high content of metalloids, such as phosphorus, carried in the ores from which the pig iron is made. My invention contemplates the use of all-steel scrap of a suitable character to produce a Bessemer grade of pig iron, without the addition of any ore to the charge.

The blast furnace is charged entirely with steel scrap, with the requisite percentage of a flux, and with coke for the purpose of melting the scrap and furnishing the carbon for recarburizing the molten product in the furnace. The smelting is then carried on as usual. By this process I am able to produce a grade of pig iron which it is impossible to obtain directly from the use of ores carrying phosphorus in excess of the Bessemer limits.

The iron so produced is a valuable product and can be used for many purposes for which high phosphorus irons are not suitable, such as the manufacture of ingot molds for steel works and as recarburizing materials used in the manufacture of high carbon steels.

This same process of producing low phosphorus pig iron can also be used to great advantage in producing spiegeleisen. By introducing into the charge of the furnace a small proportion of manganese ore with the scrap, flux and coke, a regular grade of spiegeleisen can be produced, which it is impossible now to do from ores carrying phosphorus in excess of the Bessemer limits. This is an important combination in a district where there are no low phosphorus ores.

I have referred above to steel scrap, and generally this is the only form of steel available, and that scrap is a very convenient form for making part of the blast furnace charge, but it will be understood that the same metallurgical reactions will occur with steel of any suitable composition, whether properly called scrap or not.

The invention applies not only to plain pig iron, but to irons containing other elements. And it is understood that the spiegeleisen referred to is only a low phosphorus pig iron containing a considerable percentage of manganese.

What I claim is:

1. The process of producing large quantities of iron low in phosphorus which consists in smelting with carbonaceous and fluxing materials in a blast furnace a predominating quantity of steel suitable for the purpose.

2. The process of producing large quantities of pig iron low in phosphorus which consists in smelting in a blast furnace, steel with the necessary quantity of fluxing material and coke to melt the charge and recarburize the molten metal in the charge, 3. The process of producing spiegeleisen in great quantities which consists in smelting in a blast furnace with carbonaceous and fluxing materials a charge containing manganese ore and a predominating quantity of steel scrap.

4. The process of producing an iron of high carbon content and low phosphorus content for utilization in the manufacture of steel which consists in smelting in a blast furnace a predominating quantity of steel scrap, with the necessary quantity of fluxing material and coke to melt the charge and recarburize the molten metal in the charge.

In witness whereof, I have hereunto signed my name.

FRANK H. CROCKARD.